(12) United States Patent
Potter et al.

(10) Patent No.: US 7,455,190 B2
(45) Date of Patent: Nov. 25, 2008

(54) FUEL TANK SYSTEM HAVING ENHANCED DURABILITY AND REDUCED PERMEATION

(75) Inventors: James F. Potter, Livonia, MI (US); Cory Borghi, Windsor (CA)

(73) Assignee: Automotive Components Holdings, LLC, Dearborn, MI (US)

( * ) Notice: Subject to any disclaimer, the term of this patent is extended or adjusted under 35 U.S.C. 154(b) by 753 days.

(21) Appl. No.: 10/989,532

(22) Filed: Nov. 15, 2004

(65) Prior Publication Data

US 2006/0102634 A1    May 18, 2006

(51) Int. Cl.
*B65D 6/00*    (2006.01)
*B65D 8/04*    (2006.01)

(52) U.S. Cl. .................. 220/4.14; 220/4.12; 220/653; 220/562

(58) Field of Classification Search ............... 220/4.12, 220/4.13, 4.14, 562, 563, 564, 653; 137/15.17, 137/587
See application file for complete search history.

(56) References Cited

U.S. PATENT DOCUMENTS

| 1,150,332 | A |   | 8/1915  | Boyer |
| 2,097,661 | A | * | 11/1937 | Hammond ............... 137/878 |
| 2,523,371 | A | * | 9/1950  | Jennings et al. ........... 422/107 |
| 4,304,530 | A |   | 12/1981 | Gens |
| 4,591,319 | A |   | 5/1986  | Takahashi et al. |
| 4,719,072 | A |   | 1/1988  | Kojima et al. |
| 4,952,347 | A |   | 8/1990  | Kasugai |
| 5,308,573 | A |   | 5/1994  | Hirakawa |
| 5,891,385 | A |   | 4/1999  | Cerbelle et al. |
| 5,954,091 | A |   | 9/1999  | Leadford |
| 6,138,859 | A |   | 10/2000 | Aulph et al. |
| 6,338,420 | B1 |  | 1/2002  | Pachciarz et al. |
| 6,584,996 | B2 |  | 7/2003  | Spink |
| 6,669,043 | B2 |  | 12/2003 | Fish et al. |
| 6,712,234 | B2 |  | 3/2004  | Boecker |
| 6,726,967 | B2 |  | 4/2004  | Vorenkamp et al. |
| 6,742,536 | B2 |  | 6/2004  | Mills |
| 2001/0013516 | A1 |  | 8/2001 | Boecker |
| 2005/0016600 | A1 | * | 1/2005 | Knaggs et al. ........... 137/590 |

\* cited by examiner

*Primary Examiner*—Anthony D Stashick
*Assistant Examiner*—Harry A Grosso
(74) *Attorney, Agent, or Firm*—MacMillan, Sobanski & Todd, LLC

(57) ABSTRACT

A mounting apparatus for an internalized fuel system of a fuel tank. The apparatus comprises a support portion and a valve retainer arm attached about the support portion. The support portion has a body and first and second ends. The first end has a connecting flange configured to engage the fuel tank and the second end has a reduced cross-sectional portion attached thereto to provide flexibility to the fuel tank from pressure and vacuum forces. The valve retainer arm has an attachment end attached about the support portion. The attachment end extends to a valve retainer end for retaining the internalized fuel system within the fuel tank.

14 Claims, 6 Drawing Sheets

FUEL TANK SYSTEM HAVING ENHANCED DURABILITY AND REDUCED PERMEATION

BACKGROUND OF THE INVENTION

The present invention relates to fuel tank systems having enhanced durability and reduced permeation.

Fluid tanks are common in several industries. For example, fuel tanks for motorized vehicles have been used for many years. Many of the current fuel tanks installed in motorized vehicles are made of plastic or metal. Plastic storage containers provide a number of advantages over those made of other materials. Some advantages include reduced weight, reduced cost for both materials and construction, and greater flexibility and shape. Along with these advantages, the ability of certain plastic containers to stretch or flex makes them useful in automotive applications. A problem in plastic tanks that manufacturers have experienced is that fuel may permeate through the walls of the plastic tank.

Several approaches have been taken to reduce permeation through the fuel tanks and increase support or stability of the fuel tank systems. One solution to this problem has been to internalize components in the fuel tank due to the potential likelihood of leakage of fuel vapors through the components. However, manufacturers have been challenged in internalizing such components while maintaining support to the fuel tank and limiting movement of the internalized components in the fuel tank. Manufacturers have also been challenged in providing support within the fuel tank in view of pressure and vacuum forces therein. Additionally, manufacturers are further challenged in positioning the internalized components within fuel tanks.

BRIEF SUMMARY OF THE INVENTION

The present invention provides a fluid tank system having enhanced durability and reduced permeation features. The system comprises a fuel tank including an internalized fuel system components, e.g., and a mounting apparatus. The mounting apparatus provides added support to the fuel tank and positively positions components therein for limited movement in the fuel tank.

In one embodiment, the present invention provides a fluid tank system having enhanced durability and reduced permeation. The fluid tank system comprises a fuel tank having first and second outer portions. The system further comprises a support portion having a body and first and second ends. The first end has a flange configured to engage the first outer portion of the fuel tank for providing support to the system. The second end has a reduced cross-sectional portion configured to engage the second outer portion of the fuel tank for limited movement from pressure and vacuum forces. The system further comprises a valve retainer arm having an attachment end attached to the support portion. The attachment end extends to a valve retainer end for retaining the internalized fuel system components within the fuel tank.

In another embodiment, the present invention provides a mounting apparatus for an internalized fuel system of a fuel tank. The apparatus comprises the support portion and the valve retainer arm.

In yet another embodiment, the present invention provides a method of manufacturing a fluid tank system having a supported internalized fuel system. The method comprises providing the mounting assembly of the fuel tank and extruding at least first and second outer portions of the fuel tank about the mounting assembly. The method further comprises molding the first and second outer portions of the fuel tank about the mounting assembly such that the first end of the mounting stem edges the first outer portion. The second end of the mounting stem engages the second outer portion of the fuel tank.

Further objects, features, and advantages of the present invention will become apparent from consideration of the following description and the appended claims when taken in connection with the accompanying drawings.

DETAILED DESCRIPTION OF THE INVENTION

The present invention generally provides enhanced support to a fluid tank system and localized positive positioning of internalized components within the fluid tank system. Embodiments of the present invention provide enhanced support to a fuel tank of the system by incorporating a mounting assembly that is configured to be disposed between inner walls of the fuel tank. The mounting assembly provides added support to the fuel tank and to internalized fuel tank components, such as internal vapor valves, by attaching to opposing inner walls of the fuel tank. Moreover, the placement of the mounting assembly within the fuel tank provides enhanced accuracy or positive placement for internalized components within the fuel tank. Furthermore, the mounting assembly includes a safety feature that minimizes damage to the system at threshold pressure and low vacuum conditions within the fuel tank.

Figure 1:
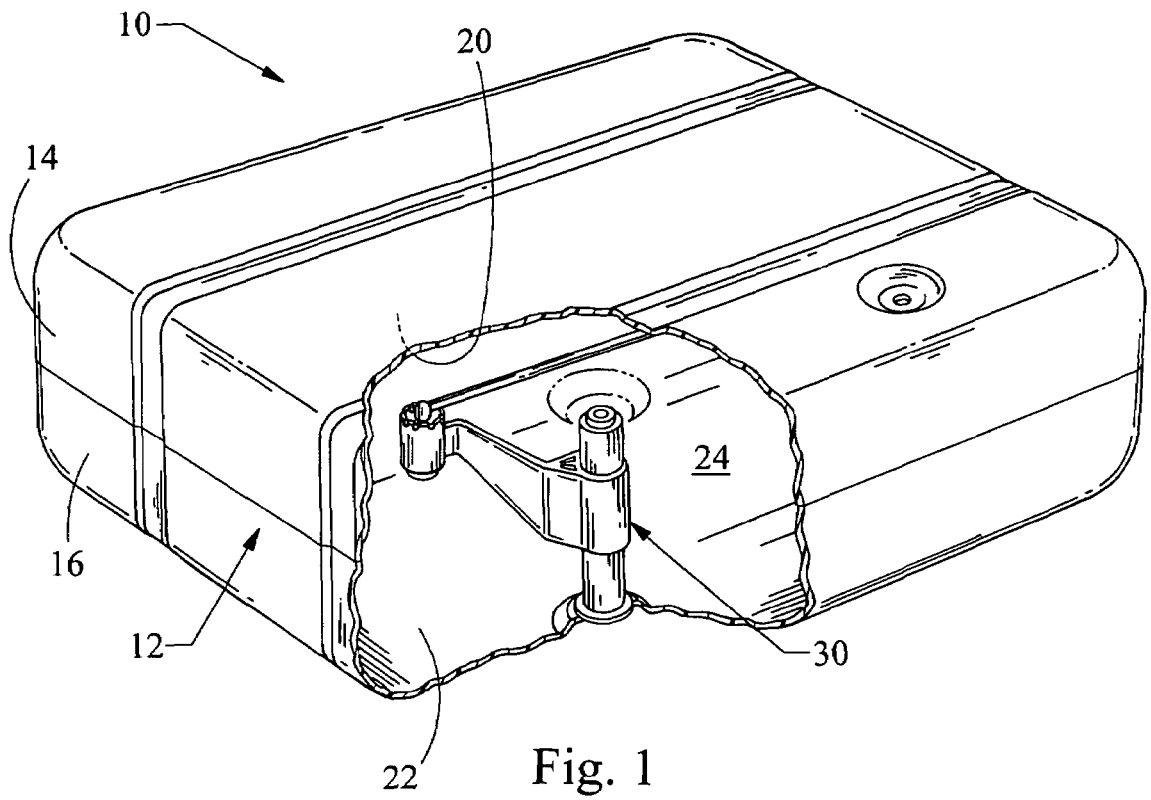
FIG. 1 is an elevated view of a fluid tank system having enhanced durability and reduces permeation in accordance with one embodiment of the present invention.

FIG. 1 illustrates a fluid tank system 10 having enhanced durability and reduced permeation in accordance with one embodiment of the present invention. As shown, the system includes a fuel tank 12 having a first outer portion 14 and a second outer portion 16 configured to be attached to the first outer portion 14 by any suitable means known in the art such as welding such as typical in twin sheet thermoforming or injection molding, or they are former by a single tubular parison which is typical of the blow molding process. Moreover, the fuel tank 12 further includes internalized fuel system components as discussed in greater detail below. In this embodiment, the first outer portion 14 of the fuel tank 12 includes a first inner wall 20 and the second outer portion 16 of the fuel tank 12 includes a second inner wall 22 cooperable with the first inner wall 20, defining a fuel retaining cavity 24 for engine fuel to be contained therein. As shown, the first inner wall 20 has an indentation to define a first mounting portion 26 formed thereon. The second inner wall 22 also has an indentation to define a second mounting portion 28 formed thereon.

It is to be understood that fuel tank 12 may be made of any suitable moldable material such as polymeric material, e.g., high density polyethylene (HDPE) or polypropylene. Moreover, the fuel tank may merely include a single layer or may be multi-layered as desired for reduced permeation as describe in U.S. Pat. No. 6,722,521, issued Apr. 20, 2004 and entitled "LOW PERMEATION PINCHOFF CONNECTION FOR BRIDGING A BARRIER LAYER AND METHOD OF MAKING SAME," which is hereby incorporated herein.

For example, the fuel tank may be comprised of a multi-layered wall including layers of polyethylene and an ethylene-vinyl alcohol (EVOH) co-polymer. In this example, the multi-layer wall may be a polyethylene-EVOH wall having a continuous inner polymeric layer, a continuous outer polymeric layer, and an EVOH copolymer layer disposed between the inner and outer polymeric layers. In this example, the continuous inner polymeric layer may be made of high density polyethylene (HDPE) and may also include carbon black compounded with the HDPE therein. Of course, the continuous inner polymeric layer may be made of any other suitable materials known in the art. Moreover, the outer polymeric layer may be placed in overlying relationship with the continuous inner polymeric layer. In this example, the outer polymeric layer is may be made of HDPE and may also include carbon black compounded with the HDPE therein. Of course, the outer polymeric layer may be made of any other suitable materials.

Fuel tank 12 may be formed using extrusion apparatus, twin-sheet thermo-forming, or blow molding techniques. Of course, other suitable ways in forming fluid tank may be used without falling beyond the scope or spirit of the present invention.

Figure 2:
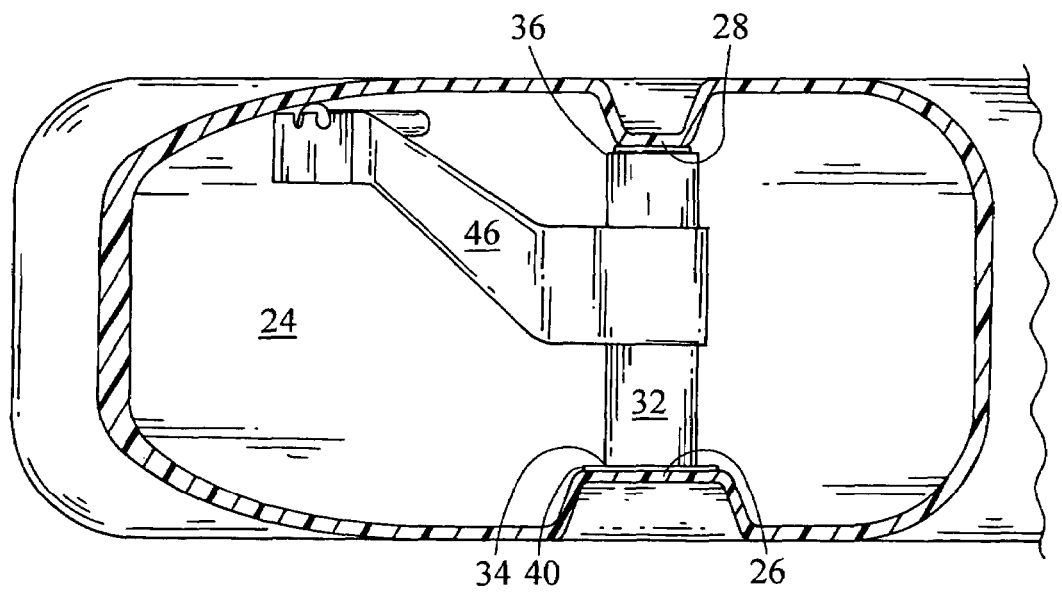
FIG. 2 is a side view of a mounting apparatus of the fluid tank system in FIG. 1.

As shown in FIG. 2, the system preferably further comprises a mounting apparatus 30 for supporting the fuel tank 12 and limiting movement of fuel system components within the fuel tank 12. As shown, the mounting apparatus 30 includes a support portion 32 having a body 33 and opposing first and second end 36s. The first end 34 has a flange 40 configured to engage the first mounting portion 26 of the first inner wall 20 to provide support to the system. The second end 36 has a reduced cross-sectional portion 42 configured to engage the second mounting portion 28 of the second inner wall 22 and to provide a safety disengagement feature responsive to threshold pressure and vacuum forces on the fuel tank 12.

Figure 3:
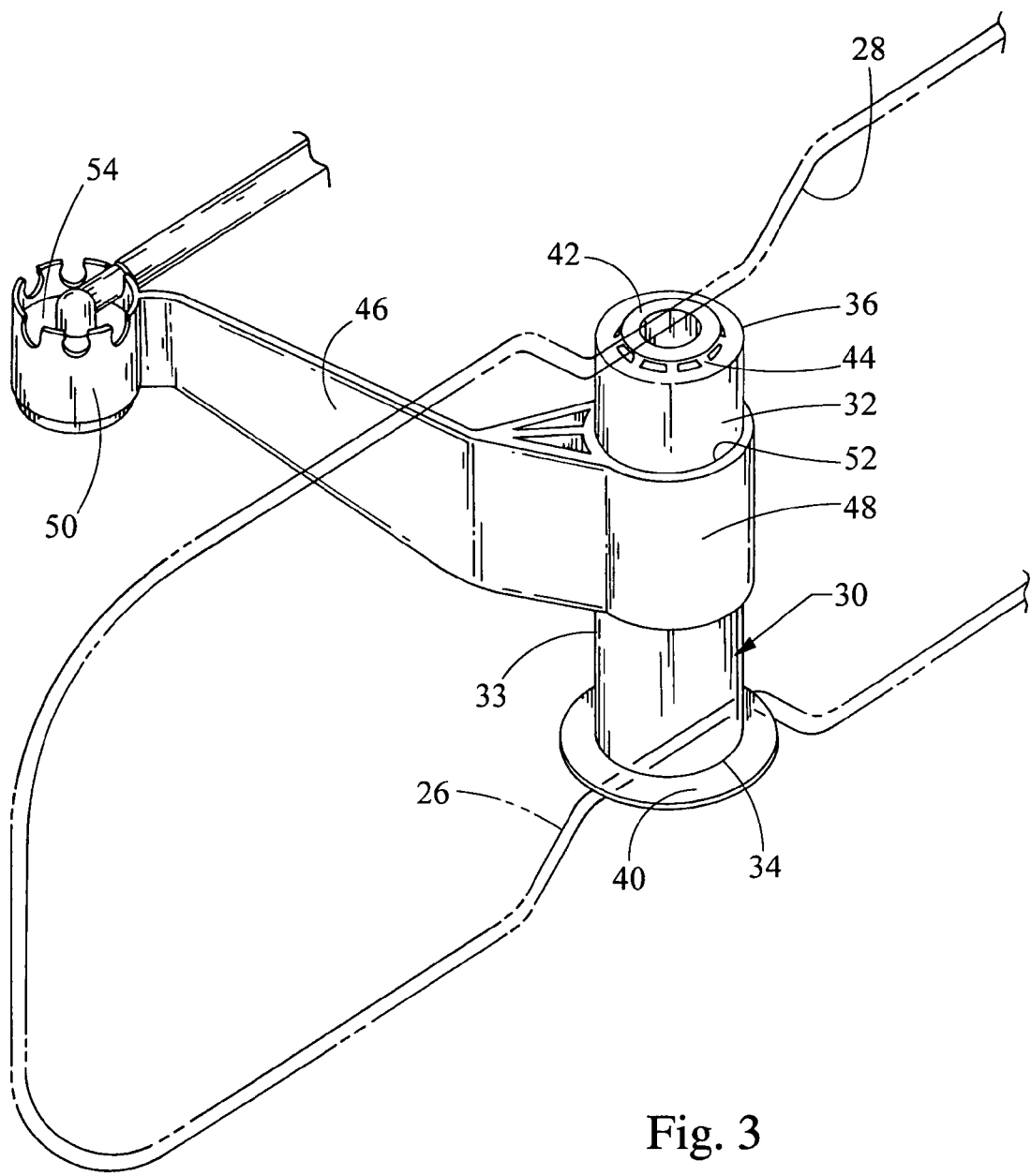
FIG. 3 is an isometric view of the mounting apparatus of FIG. 2.
Figure 4:
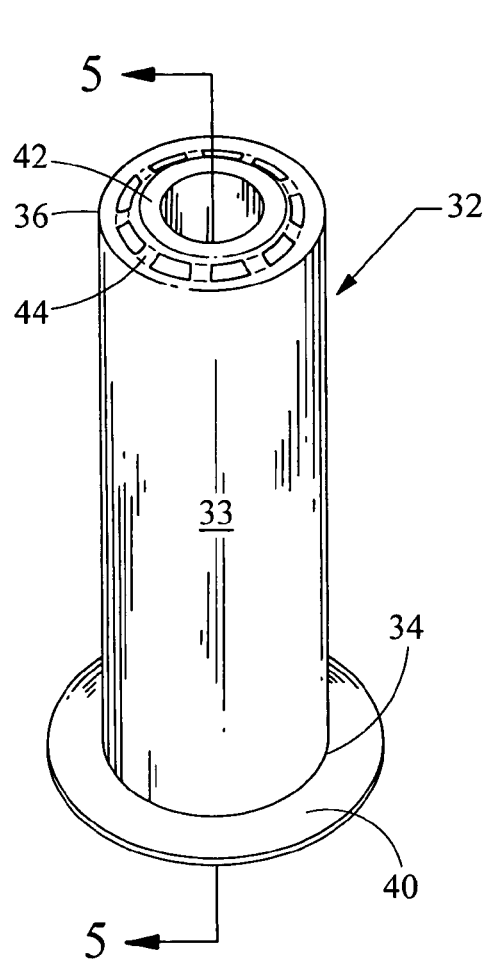
FIG. 4 is a perspective view of a support portion of the mounting apparatus in accordance with one embodiment of the present invention.

As shown in FIGS. 2 and 3, the first end 34 of the support portion 32 cooperates with the first mounting portion 26 of the first inner wall 22 for providing support to the system. Moreover, the second end 36 of the support portion 32 cooperates with the second mounting portion 28 of the second inner wall 20 for safety release from pressure and vacuum forces placed on the fuel tank 12.

Figure 5:
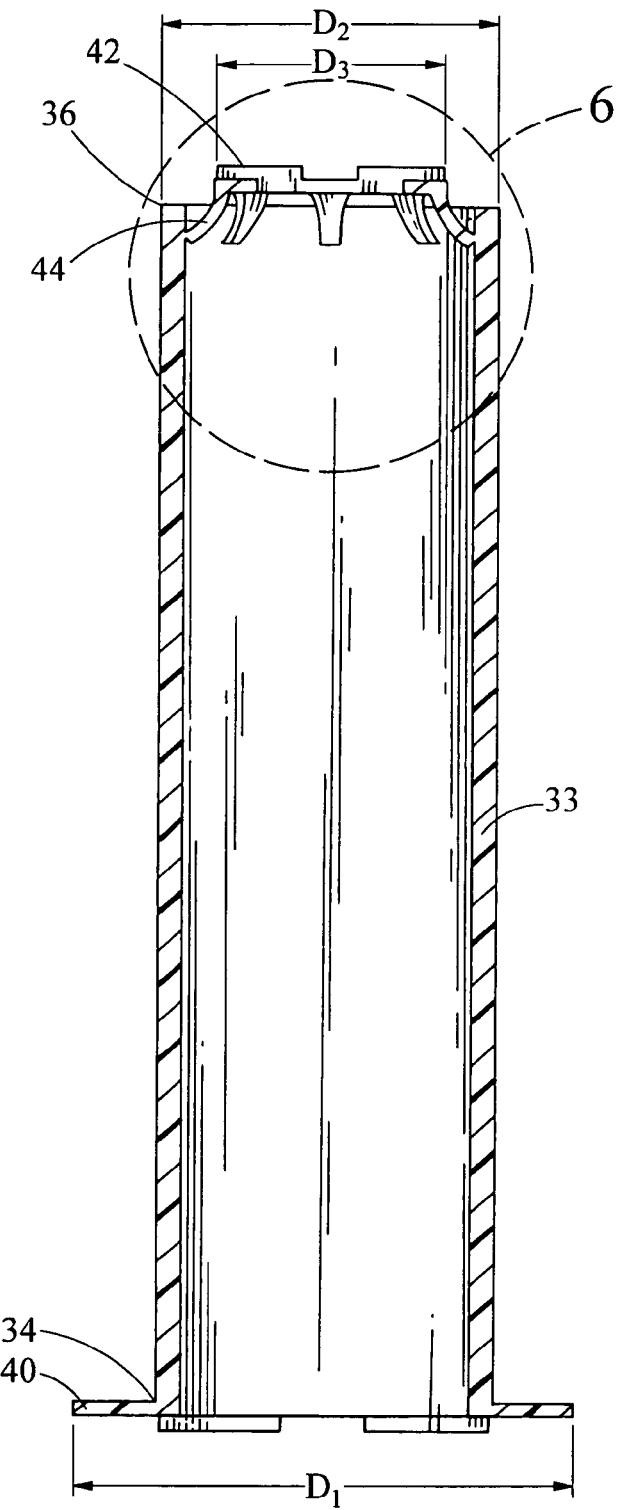
FIG. 5 is a cross-sectional view of the support portion in FIG. 4 taken along line 5-5.
Figure 6:
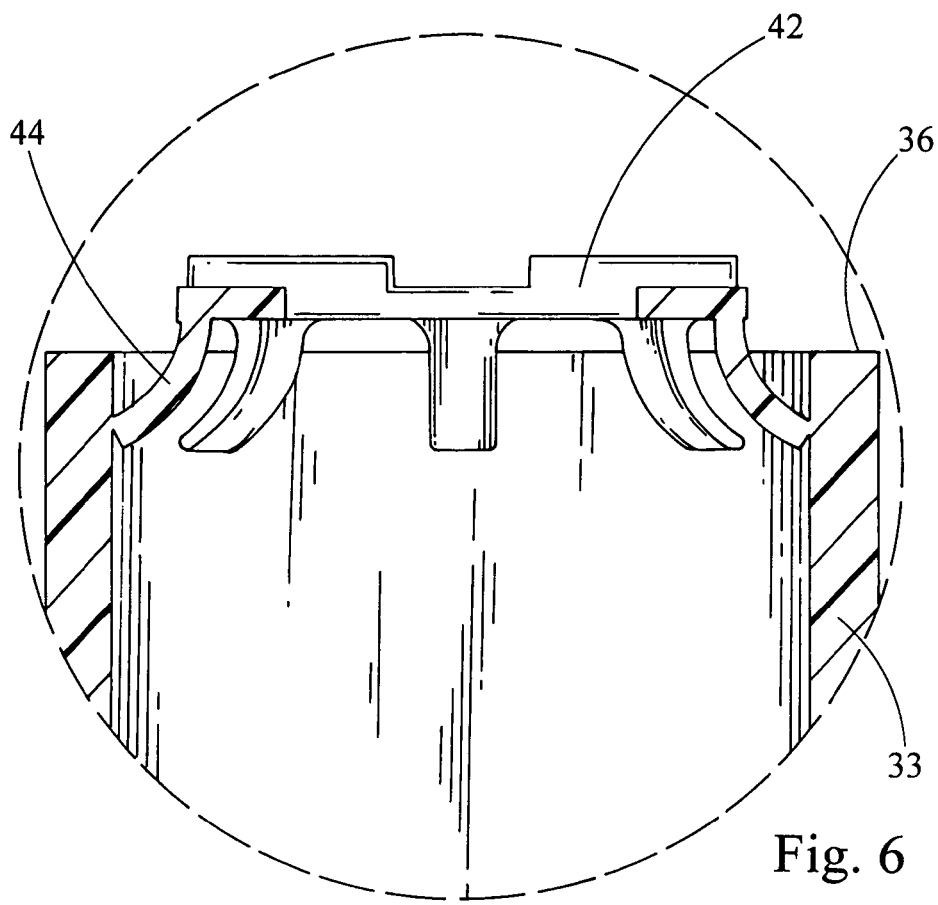
FIG. 6 is an enlarged view of the support portion in circle 6 of FIG. 5.

Referring to FIGS. 5 and 6, the flange 40 has a first outer diameter D, for providing support to the system. In this embodiment, the body 33, first end 34, and second end 36 have substantially the same outer diameter referred to as a second outer diameter $D_2$ less than the first outer diameter $D_1$. As shown, the reduced cross-sectional portion 42 includes legs 44 attached to the second end 36 and extending therefrom to a ring having a third outer diameter $D_3$. Preferably, the third outer diameter $D_3$ is less than the second outer diameter $D_2$. The ring engages the second outer portion 16 of the fuel tank 12 and is configured for safety release therefrom at high pressure and low vacuum forces as discussed in greater detail below.

As mentioned above, the reduced cross-sectional portion 42 is configured to disengage from the second inner wall 22 at a predetermined threshold pressure placed on the fuel tank 12 from pressure and vacuum forces. In this embodiment, the legs 44 are configured to disengage or detach from the second end 36 of the support portion 32 when the threshold pressure or vacuum is reached. Preferably, the predetermined threshold pressure may range, but is not limited to between about 2 and 10 pounds per square inch gauge. The predetermined vacuum may range, but is not limited to between about 0 and −5 pounds per square inch gauge. In use, further potential damage to the fluid tank system 10 are avoided when threshold pressure and vacuum levels are reached in the fuel tank 12. Rather, potential damage and leakage may be safely maintained and isolated within the fuel tank 12 only.

In this embodiment, the mounting apparatus 30 of the system further comprises a valve retainer arm 46 having an attachment end 48 attached about the body 33 of the support portion 32. The attachment end 46 extends to a valve retainer end 50 for retaining internalized fuel system components, e.g., a vapor valve assembly 54, within the fuel tank 12. Preferably, the attachment end 48 of the valve retainer arm 46 has an attachment bore 52 formed therethrough and is attached about the body 33 of the support portion 32. As shown, one of the internalized fuel system components may include a vapor valve assembly 54 for regulating vapor pressure in the fuel tank 12. In this embodiment, the valve retainer end 50 has a holding portion, e.g. a holding cup, formed thereon to hold the vapor valve assembly 54 adjacent the first inner wall 20.

The valve retainer arm 46 may take on any suitable shape of configuration. For example, the valve retainer arm 46 may be larger that shown in the drawings and perforated to provide a slosh reduction baffle, reducing fuel slosh in the fuel tank during vehicle use.

In another embodiment, the valve retainer arm 46 may be placed adjacent to the bottom of the tank. In this embodiment, the valve retainer arm may hold the fuel pump, the fuel level indication device, and/or a fuel retention reservoir.

It should be noted that the valve retainer end 50 may be designed to provide a baffle protection configuration to vapor valve assembly. The baffle protections configuration would help reduce the exposure to liquid fuel and thereby reduce the chance of liquid entering valve assembly. Additionally, the vapor valve assembly 54 may be any suitable valve, e.g., a vapor grade vent valve or a fill limit vapor valve.

It is to be noted that the mounting apparatus 30 may be configured such that the valve retainer arm is in a position during molding and is subsequently moved by rotating or sliding into position after the tank is molded. This may be accomplished by any suitable means such as by reaching in the tank through the bore to move the arm.

Figure 7:
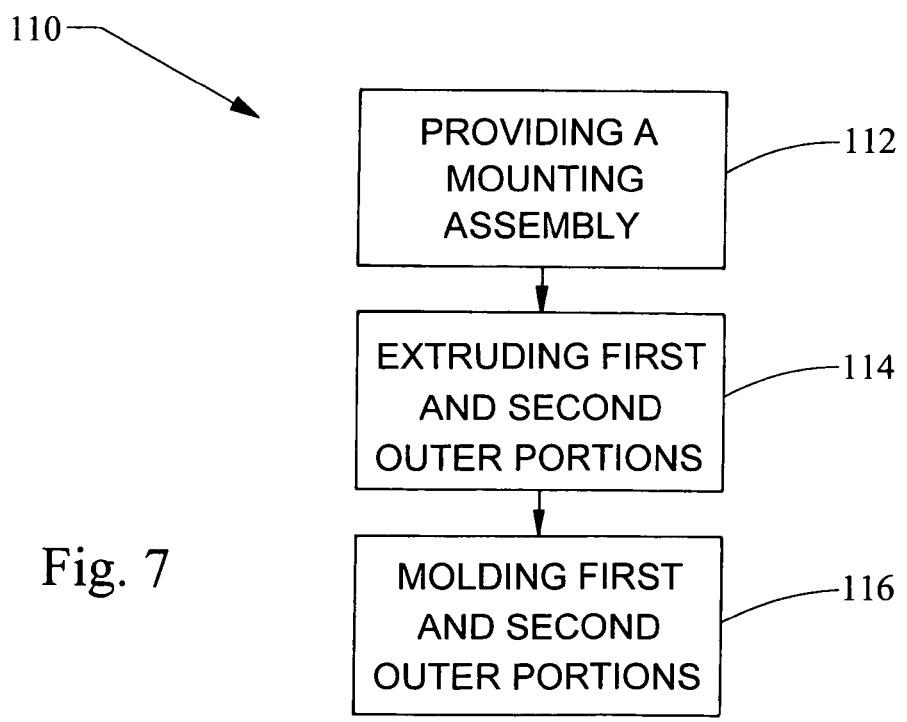
FIG. 7 is a flow chart depicting one method of manufacturing the fluid tank system in accordance with one example of the present invention.
Figure 8A:
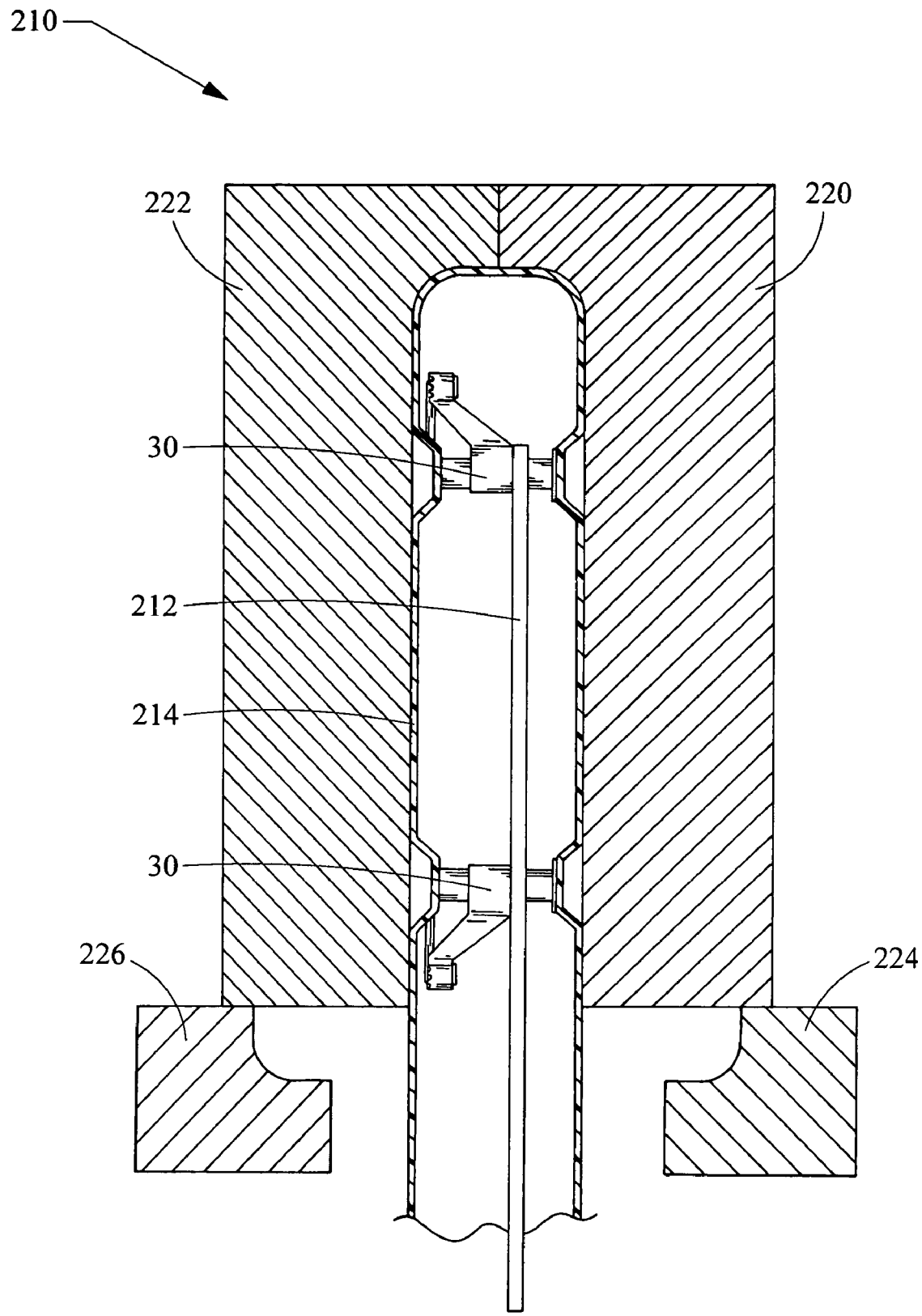
FIG. 8a is a side view of a manufacturing apparatus for a method of manufacturing the fluid tank in accordance with one embodiment of the present invention.
Figure 8B:
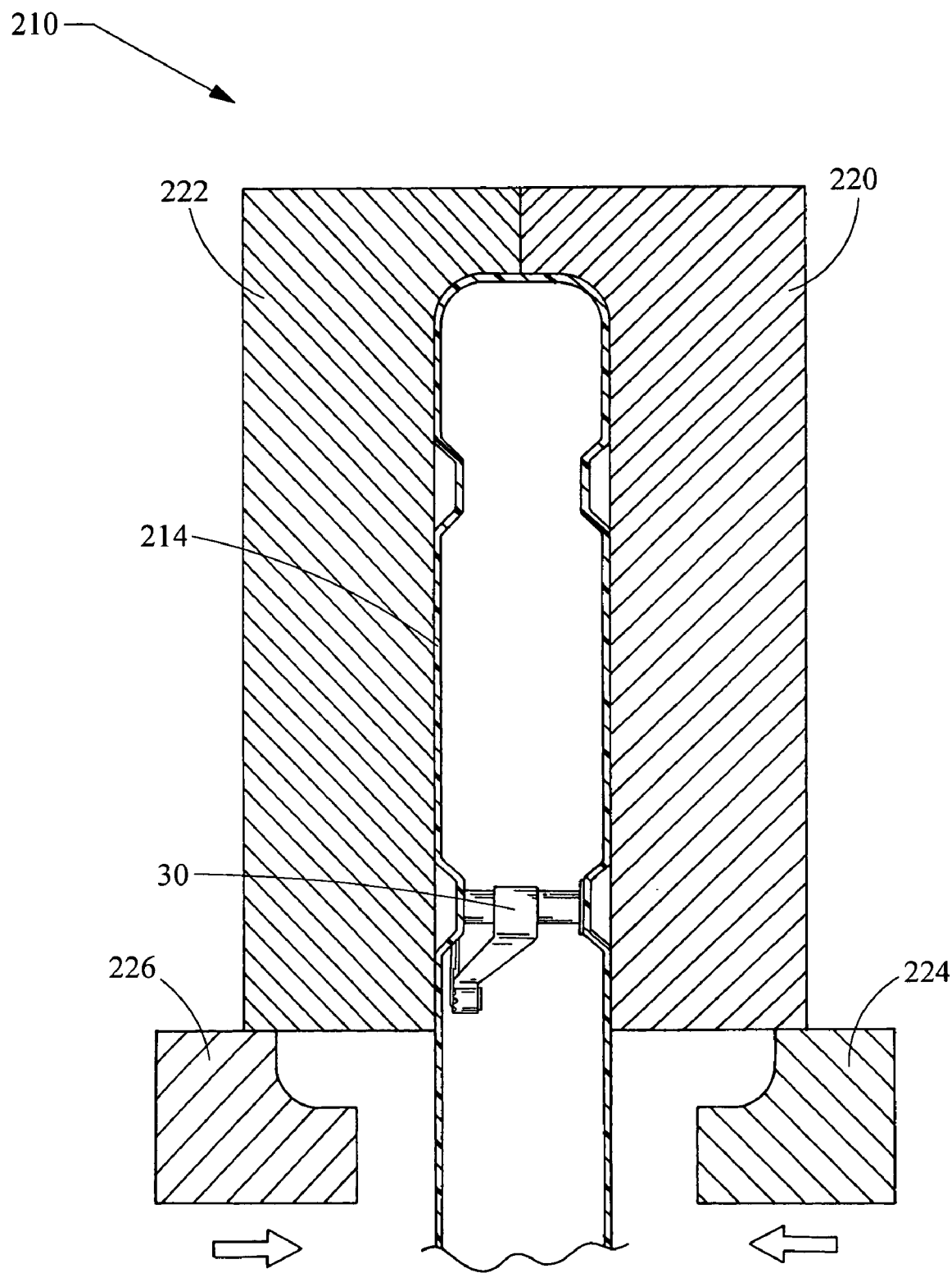
FIG. 8b is another side view of the manufacturing apparatus in accordance with one embodiment of the present invention.

FIG. 7 is a flowchart depicting one method 110 of manufacturing a fluid tank system 10 having a supported internalized fuel system such as the fluid tank system 10 mentioned above. Moreover, FIGS. 8a and 8b illustrate one example of a manufacturing apparatus 210 that may be implemented with the method depicted in FIG. 7. In this example, the mounting assembly of the fuel tank 12 system is provided as mentioned above in box 112. As shown, a holding fixture 212 holds the mounting apparatus 30 such that the fuel tank 12 may be extruded thereabout. The first and second outer portions 14, 16 of the fuel tank 12 are then preferably extruded in box 114 about the mounting apparatus 30 and define a parison 214 disposed thereabout. In this embodiment, holding fixture 212 maintains support to the mounting apparatus 30 from the bottom of the parison 214.

In this example, first and second top mold sections 220, 222 and first and second bottom mold sections 224, 226 are then implemented to mold a portion of the parison 214 into a predetermined shape of the fuel tank 12 as desired in box 116. This may be accomplished by moving the first and second top molding sections 220, 222 together to a first closed position, trapping the mounting assembly within the first and second outer portions 14, 16 of the fuel tank 12. Thus, in this example, the first end 34 of each support portion 32 engages the first mounting portion 26 of the first inner wall 20 and the second end 36 of each support portion 32 engages the second mounting portion 28 of the second inner wall 22.

The holding fixture 212 is then removed from the open bottom of the parison. The first and second bottom molding sections 224, 226 are moved together to a second closed position, trapping the mounting assembly in the fuel tank 12, to mold the remainder of the fuel tank 12.

In use, the fluid tank system included enhanced support with a safety release feature and contains internalized components that are positively positions therein. The enhanced support feature provides added rigidity or stability to the fuel tank without compromising safety. Furthermore, internalized components are able to be accurately positioned within the fuel tank with limited movement therein.

While the present invention has been described in terms of preferred embodiments, it will be understood, of course, that the invention is not limited thereto since modifications may be made to those skilled in the art, particularly in light of the foregoing teachings.

The invention claimed is:

1. A fluid tank system having enhanced durability and reduced permeation, the fluid tank system comprising:
   a fuel tank having first and second outer portions and internalized fuel system components;
   a support portion having a body and first and second ends, the first end having a flange configured to engage the first outer portion of the fuel tank for providing support to the system, the second end having a reduced cross-sectional portion configured to engage the second outer portion of the fuel tank for limiting movement from pressure and vacuum forces, the second end having a second outer diameter less than the first outer diameter, the reduced cross-sectional portion including legs extending from the second end to a ring having a third outer diameter to engage the second outer portion of the fuel tank for limited movement from pressure and vacuum forces, the third outer diameter being less than the second outer diameter; and
   a valve retainer arm having an attachment end attached to the support portion, the attachment end extending to a valve retainer end for retaining the internalized fuel system within the fuel tank.

2. The system of claim 1 wherein the first outer portion of the fuel tank includes a first inner wall and the second outer portion of the fuel tank includes a second inner wall, the first inner wall having a first mounting portion formed thereon and the second inner wall having a second mounting portion formed thereon.

3. The system of claim 2 wherein the first end of the support portion cooperates with the first mounting portion of the first inner wall for providing support to the system and the second end of the support portion cooperates with the second mounting portion of the second inner wall for limiting movement from pressure and vacuum forces.

4. The system of claim 1 wherein the flange has a first outer diameter for providing support to the system.

5. The system of claim 3 wherein the reduced cross-sectional portion is configured to disengage from the second inner wall at a threshold pressure placed on the fuel tank from pressure and vacuum forces.

6. The system of claim 1 wherein the attachment end of the valve retainer arm has an attachment bore formed therethrough and is attached about the support portion.

7. The system of claim 1 further comprising a supported internalized fluid tank system including: a vapor valve assembly for regulating vapor pressure in the fuel tank.

8. The system of claim 7 wherein the valve retainer end has a holding portion formed thereon to hold the vapor valve assembly adjacent the first inner wall.

9. A mounting apparatus for an internalized fuel system of a fuel tank, the apparatus comprising:
   a support portion having a body and first and second ends, the first end having a connecting flange configured to engage the fuel tank and the second end having a reduced cross-sectional portion attached thereto to provide flexibility to the fuel tank from pressure and vacuum forces, the second end having a second outer diameter, the reduced cross-sectional portion including legs extending from the second end to a ring having a third outer diameter, the third outer diameter being less than the second outer diameter; and
   a valve retainer arm having an attachment end attached to the support portion, the attachment end extending to a valve retainer end for retaining the internalized fuel system within the fuel tank.

10. The apparatus of claim 9 wherein the flange has a first outer diameter.

11. The apparatus of claim 9 wherein the reduced cross-sectional portion is configured to disengage from the second inner wall at a threshold pressure placed on the fuel tank for enhanced support.

12. The apparatus of claim 9 wherein the attachment end of the valve retainer arm has an attachment bore formed therethrough and is attached about the support portion for support.

13. The apparatus of claim 9 wherein the valve retainer arm has a holding portion formed to hold the internalized fuel system of the fuel tank.

14. The apparatus of claim 13 wherein the holding portion is a holding cup.

* * * * *